United States Patent [19]

Goloff

[11] 4,420,141
[45] Dec. 13, 1983

[54] VARIABLE RATE VALVE SPRING

[75] Inventor: Alexander Goloff, East Peoria, Ill.

[73] Assignee: Caterpillar Tractor Co., Peoria, Ill.

[21] Appl. No.: 296,405

[22] Filed: Aug. 26, 1981

[51] Int. Cl.³ .............................................. F16F 1/00
[52] U.S. Cl. ................................ 251/337; 123/90.65; 267/158
[58] Field of Search ............... 267/166, 167, 172, 158; 123/90.65; 251/337

[56] References Cited

U.S. PATENT DOCUMENTS

| | | | |
|---|---|---|---|
| 1,840,128 | 1/1932 | Pfeiffer | 123/90.66 |
| 2,117,434 | 5/1938 | Krebs | 123/90.66 |
| 2,142,224 | 1/1939 | Turlay | 251/337 |
| 2,821,971 | 2/1958 | Benz et al. | 123/90.66 |
| 3,055,350 | 9/1962 | Buchi | 123/79 C |
| 3,195,528 | 7/1965 | Franklin | 123/90.65 |
| 3,602,205 | 8/1971 | Turkish | 123/90.65 |
| 3,612,016 | 10/1971 | Jelen | 251/337 |
| 3,853,101 | 12/1974 | Iskenderion et al. | 123/90.65 |

FOREIGN PATENT DOCUMENTS

| | | | |
|---|---|---|---|
| 1060726 | 4/1954 | France | 251/337 |
| 122379 | 1/1919 | United Kingdom | 123/90.65 |

*Primary Examiner*—A. Michael Chambers
*Attorney, Agent, or Firm*—Wood, Dalton, Phillips, Mason & Rowe

[57] ABSTRACT

A varible rate spring for use in a combustion engine has a lower spring rate at high valve lifts than at low valve lifts to reduce contact stresses in the valve train assembly (24) at maximum valve lift. In one embodiment, the varible rate spring includes a cantilevered spring (70) having a free end (80) for engagement with a valve (12), a fixed end secured to a cylinder head (18) and an intermediate portion (88) which engages a pair of stops (90/92). As the valve moves between the seated position to an intermediate lift position only that portion of the spring (70), from its free end (80) to the intermediate portion (88) engaging the stops (90/92) is active. At the intermediate lift position the spring (70) disengages the stops (90/92) and the entire length of the spring (70) becomes active thereby decreasing the spring rate. In another embodiment two coil springs (94/96) are connected in series having a separator (110), which acts as a spring damper, disposed therebetween. The separator (110) engages a spring retainer (98) to preload the lower spring. Only the upper spring (96) is active as the valve (12) moves between the seated and intermediate lift position, the preload on the lower spring (96) being overcome at the intermediate lift position so that both springs (94/96) are active as the valve (12) moves to the maximum lift position.

24 Claims, 7 Drawing Figures

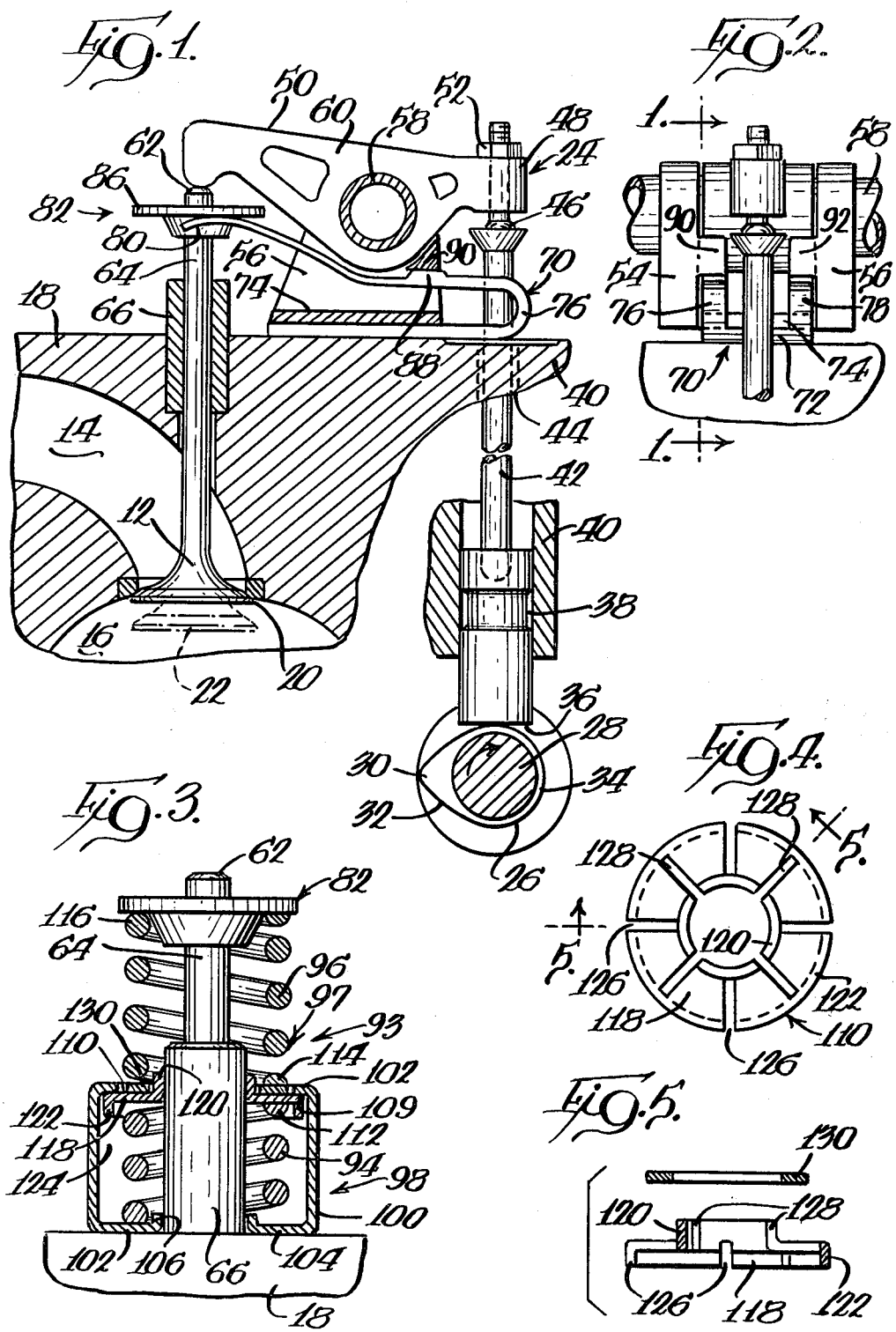

VARIABLE RATE VALVE SPRING

DESCRIPTION

1. Technical Field

This invention relates generally to a variable rate valve spring for use in an internal combustion engine and more particularly to such a spring having a lower spring rate at high valve lifts than at low valve lifts.

2. Background Art

Valve springs for use in an internal combustion engine have been known to include a conventional coil spring having a linear spring rate. These springs typically result in a greater spring force than is necessary at the point of maximum valve lift while barely providing sufficient force to prevent valve train separation resulting from spring surge at overspeed operation. Further problems arise when such springs are employed in super-charged multicylinder engines where high manifold pressure fluctuations prevent positive valve seating due to an insufficient spring preload. In order to overcome these problems, the spring rate of these conventional coil springs has typically been increased to a very high rate.

By increasing the spring rate, contact stresses present in the valve train are also increased impairing the durability of the engine. These increased contact stresses are particularly apparent at the cam nose. At maximum valve lift when the cam nose, having a small radius of curvature, contacts a flat follower, the contact stress associated with high spring rates results in fretting so that cam wear is accelerated, ultimately increasing the cost of operation.

A cantilevered valve spring having a high natural frequency and a linear spring rate has also been employed to eliminate spring surge and valve separation. However, the problems associated with a high spring rate at maximum lift are still present. At maximum lift the known cantilevered valve springs provide a greater force than is necessary to prevent valve train separation and these forces contribute to fretting of the valve train parts.

Other known valve springs, having a spring rate which increases with increased valve deflection, have further been employed to reduce spring surge. Such valve springs typically include damper coils at one or both ends of the spring so that a large number of active coils are present at low valve lifts resulting in a low spring rate, whereas only a small number of active coils are present at maximum valve lift resulting in a high spring rate. At maximum valve lift the spring rate resulting from the use of these damper coils is even higher than the spring rate at maximum lift for linear rate springs, thereby increasing the contact stresses and subjecting the valve train parts to even more wear.

The present invention is directed to overcoming one or more of the problems as set forth above.

DISCLOSURE OF THE INVENTION

According to one aspect of the present invention, a spring means includes a first end, a second end and a preselected intermediate portion with a first effective length from the first end to the intermediate portion and a second effective length from the first end to the second end. The spring means has a first spring rate over the first effective length and a second spring rate over the second effective length, the second spring rate being less than the first spring rate. Stop means are provided for preloading the spring means at the intermediate portion, only the first effective length being active in response to a valve moving between a seated position and an intermediate lift position. In response to the valve reaching the intermediate lift position the preload on the spring means is overcome, the second effective length being active in response to the valve moving between the intermediate lift position and the maximum lift position.

As a result, the advantageous effects of the invention, among which is providing a second spring rate at high valve lifts which is lower than the first spring rate at low valve lifts, solve the problems created by conventional valve springs having very high spring rates.

BRIEF DESCRIPTION OF THE DRAWINGS

The details of construction and operation of the invention are more fully described with reference to the accompanying drawings which form a part hereof and in which like reference numerals refer to like parts throughout.

In the drawings:

FIG. 1 is a fragmentary vertical section showing one embodiment of a variable rate valve spring of the present invention and the associated valve train assembly and taken approximately along the line 1—1 of FIG. 2;

FIG. 2 is an end view of the variable rate valve spring and valve train assembly shown in FIG. 1;

FIG. 3 is an elevation of a second embodiment of the variable rate valve spring of the present invention with parts shown in section;

FIG. 4 is a top view of a spring separator employed in the embodiment of FIG. 3;

FIG. 5 is a section of the spring separator shown in FIG. 4;

BEST MODES FOR CARRYING OUT THE INVENTION

Figure 6:
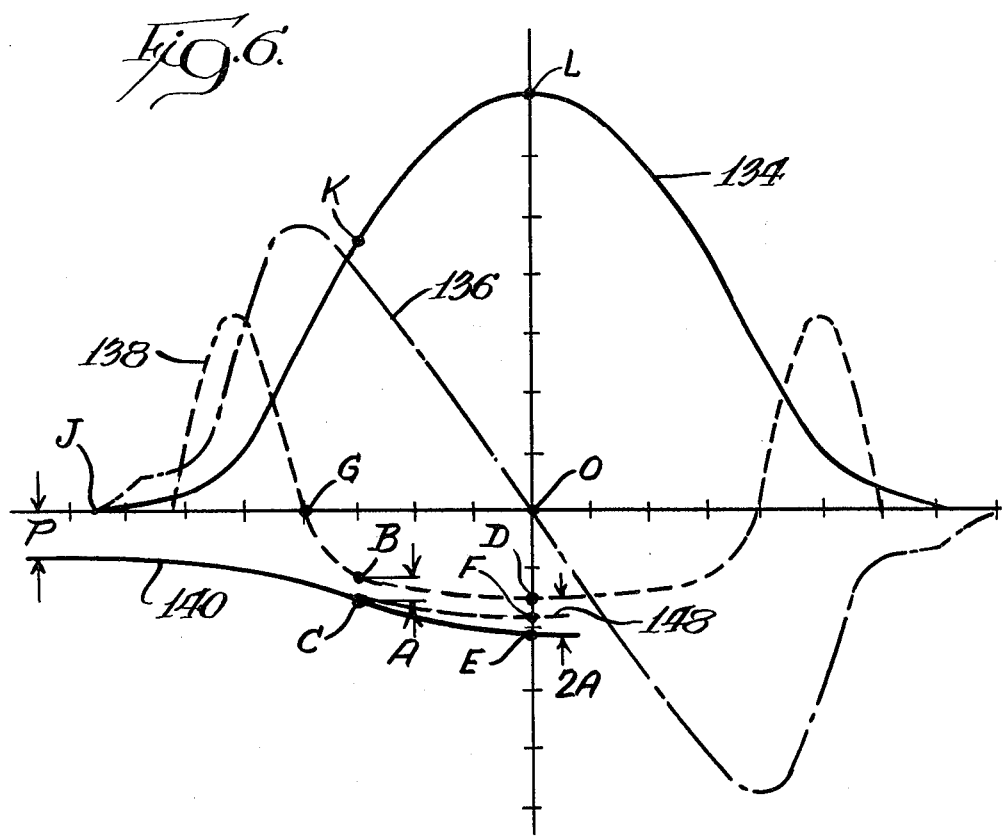
FIG. 6 illustrates typical valve lift, velocity and acceleration curves and a spring force curve for the variable rate spring of the present invention.

Referring to FIG. 1 of the drawings, a valve 12 is shown for opening and closing a port (intake or exhaust) 14 leading to a combustion chamber 16 formed in part in a cylinder head 18. In its closed position, the valve 12 sealingly engages a valve seat 20. To open the port 14, the valve 12 is moved to a maximum lift position 22 by means of a valve train assembly generally designated 24.

The valve train assembly 24 is comprised of a number of interengaging parts and includes a cam 26 mounted on a rotatable camshaft 28. The cam has a small radius of curvature at the cam nose 30, the radius of curvature increasing at the flank 32 of the cam and decreasing at the cam base 34. The cam 26 engages a flat end or follower 36 on a conventional hydraulic lifter 38 slidably mounted in the engine block 40. As the cam rotates in a clockwise direction, the lifter 38 is driven upward to a maximum lift position where the follower 36 engages the tip of the cam nose 30. The lifter 38 in turn engages a reciprocable push rod 42 extending through a bore 44 in the block 40. At its upper end, the push rod 42 engages a bearing 46 mounted on one end 48 of a rocker arm 50 and secured thereto by a nut 52 for lash adjustment.

As seen in FIGS. 1 and 2, the rocker arm 50 is pivotally mounted between two brackets 54 and 56 on a shaft 58 extending through the hub 60 of the rocker arm. As the cam 26 rotates to the maximum lift position, the push rod 42 is moved upward, pivoting the rocker arm 50 about the shaft 58 in a counterclockwise direction. The rocker arm 50 engages an end 62 of a valve stem 64 which extends through a valve guide 66 mounted in the head 18. As the rocker arm pivots in the counterclockwise direction, engaging the valve stem 64, the valve 12 is driven downward to the maximum lift position 22.

The variable rate spring of the present invention includes a cantilevered valve spring 70 of variable thickness and having a high natural frequency to reduce spring surge in the event of overspeed. The cantilevered spring 70 is compact in height so that it may be employed in engines having height restrictions imposed thereon. The spring 70 has a fixed end 72 mounted between the cylinder head 18 and a base 74 of the rocker arm brackets 54 and 56. The remainder of the spring 70 is bifurcated to provide two cantilevered spring tongues 76 and 78 extending outwardly from the fixed end 72. The tongues 76 and 78 are C-shaped and one extends on each side of the push rod 42 and between the rocker arm brackets 54 and 56. Although the cantilevered spring 70 as shown in FIG. 1 is C-shaped, a cantilevered spring having an L-shape or one that is substantially straight could also be employed.

Each of the tongues 76 and 78 have free ends, only end 80 of the tongue 76 being shown in FIG. 1, for engagement with a spring retainer 82, which preferably is a conventional valve rotator as well. The spring retainer 82 is secured to the valve stem 64 at its upper end and includes an outwardly extending flange or spring contact 86. The free ends 80 of the tongues 76 and 78 engage the lower surface of the spring contact 86 on opposite sides of the valve stem 64 to maintain a balanced spring force on the valve 12.

The cantilevered spring 70 is preloaded at its free ends 80 by the spring retainer 82 and is also preloaded at an intermediate portion 88 by a pair of stops 90 and 92. The stops 90 and 92 are mounted on the facing surfaces of the respective brackets 54 and 56 for engagement with the upper surface of the respective tongues 76 and 78. In order to compensate for fretting of the spring 70, and thereby increase the fatigue life of the spring, that portion 88 of the spring which engages the stops 90 and 92 is thickened.

When the valve 12 is in the seated position 20, the spring 70 engages the stops 90, 92 so that only the length of the spring extending from the free end 80 to the intermediate portion 88, abutting the stops 90,92 is active and bends. When the valve 12 reaches some intermediate position between the seated and maximum lift positions, the spring 70 disengages the stops 90,92 so that the entire length of the cantilevered spring from the free end 80 to the fixed end 72 becomes active thereby decreasing the spring rate at maximum valve lift. Because the spring rate is reduced at maximum lift, contact stresses throughout the valve train assembly 24 are also reduced.

Another embodiment of the variable rate spring of the present invention is generally designated 93 as shown in FIG. 3. The variable rate spring 93 includes a lower coil spring 94 and an upper coil spring 96 connected in series at an intermediate portion 97. The lower spring 94 is disposed in a spring retainer 98 having a cylindrical sidewall 100 and flanges 102 and 104 extending radially inward from the respective upper and lower edges of the sidewall. The flange 104 of the spring retainer 98 is secured to the head 18 and includes at its inner diameter a flange 106 extending upwardly between the end 108 of the lower spring 94 and the valve guide 66. The upper flange 102 at its lower surface 109 engages the periphery of a separator 110 disposed between an end 112 of the lower spring 94 and an end 114 of the upper spring 96. The inner diameter of the upper flange 102 is slightly greater than the diameter of the spring 96 so that the spring 96 can extend therethrough.

The variable rate spring 93 is preloaded at an end 116 of the upper spring 96 by the spring retainer or valve rotator 82. The spring 93 is also preloaded at the separator 110 which engages the spring retainer 98 to apply a preload to the lower spring 94. The preload provided by the spring retainer 98 to the lower spring 94 is sufficiently great so that only the upper spring 96 is active as the valve 12 is moved from its seated position to some intermediate lift position, the effective length of spring 93 being equal only to the length of the upper spring 96. At the intermediate lift position, the preload of the lower spring is overcome and the separator 110 parts from the flange 102 of the spring retainer 98. Both springs 94 and 96 are active as the valve moves from the intermediate lift position to maximum lift so that the effective length of the spring 93 is increased to include the lengths of both the upper and lower springs. By increasing the effective length of the spring 93, the spring rate is thereby decreased reducing contact stresses in the value train assembly.

The separator 110 is shown in greater detail in FIGS. 4 and 5. The separator 110 includes a washer-like disc 118 for engaging the upper and lower springs 94 and 96 at ends 112 and 114 respectively. A flange 120 extends upwardly from the inner diameter of the disc 118. The separator 110 also includes a downwardly extending flange 122 at the outer diameter of the disc 118 which is adjacent to the inner surface 124 of the sidewall 100. The flange 122 of the separator 110 is guided by the retainer 98 as the separator moves downward with the springs 94,96 when the preload on the lower spring 94 is overcome at the intermediate lift position.

The separator 110 is made radially elastic so that the flange 120 rubs lightly against the valve guide 66 to provide spring damping. To provide radial flexibility, alternating slots 126 and 128 are formed in the separator 110. Four slots 126 are disposed at 90° intervals about the separator, extending from the outer periphery of the downwardly extending flange 122, through the disc 118 to the upwardly extending flange 120. Four slots 126 are disposed at 90° intervals about the separator, each slot 128 being positioned approximately 45° from the two adjacent slots 126. The slots 128 extend from the periphery of the upwardly extending flange 120 through the disc 118 to the downwardly extending flange 122. The separator 110 also includes a stamped washer 130 which rests on the disc 118 and through which the flange 120 extends. The washer 130 supports the lower end 114 of the spring 96.

INDUSTRIAL APPLICABILITY

Figure 7:
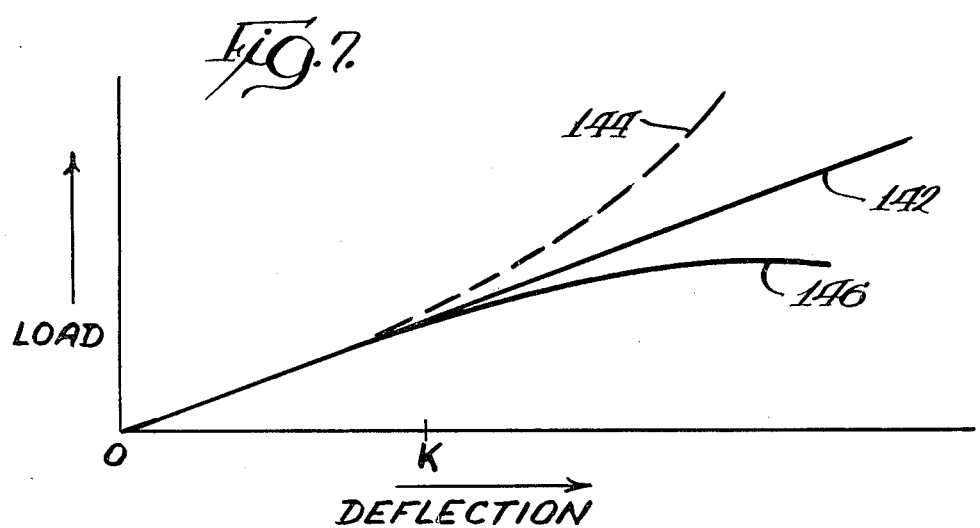
FIG. 7 illustrates linear and variable spring rate curves.

The operation of the variable rate spring is illustrated with reference to FIGS. 6 and 7 showing typical plots of a valve lift or deflection curve 134, a valve velocity curve 136, a valve acceleration curve 138, a spring force curve 140 and a spring rate curve 142. The valve acceleration curve 138 is of particular interest as it is the acceleration curve which determines the spring load requirements for preventing undesirable valve train separation.

The forces which act on the valve train assembly include a spring force and a valve force which is equal to the effective valve mass multiplied by the acceleration of the valve. For positive acceleration of the valve, the valve force and spring force are in the same direction and add together to hold the valve train assembly in compression. However, for negative acceleration (deceleration) of the valve, as shown from points G to D on curve 138, the valve force is in the opposite direction of the spring force and thus subtracts from the spring force. For negative acceleration, only the excess spring force acts to hold the valve train assembly together. Further, spring surge often occurs at the transition zone between positive and negative valve acceleration and results in forces which both add to and subtract from the spring force. The valve spring must provide a sufficient force to hold the valve train assembly together for all operating speeds, compensating for negative valve acceleration and spring surge.

The spring force for a conventional linear rate spring is illustrated by curve 140. The spring force is equal to the spring preload P, that force required to hold the valve in its seated position 20, plus the spring rate multiplied by the valve deflection or lift. It is seen that for a conventional spring having a linear spring rate 142, shown in FIG. 7, the spring force at maximum lift, L, is equal to OE. For a spring employing damper coils so that the spring rate increases with increased deflection, shown in FIG. 7 by curve 144, the spring force at maximum lift, L, will be even greater than OE.

The spring forces OE are greater at maximum lift resulting from springs having a linear rate or a spring rate which increases with increased deflection, and are unnecessarily high. The value of the excess spring force over the minimum required is designated by A, the distance between points B and C. Point B is the point on the acceleration curve 138 at which the valve approaches a constant deceleration after the transition zone between positive and negative valve acceleration where spring surge typically occurs. Point C is the corresponding point on the spring force curve 140. The spring force OE at maximum lift for a conventional linear rate spring results in an excess spring force of 2A, the distance between points D on curve 138 and E on curve 140. This excess spring force of 2A is unnecessarily high and does not substantially aid in preventing valve train separation since an excess force of A is sufficient to hold the valve train assembly together. This excess spring force does, however, increase the contact stresses in the valve train assembly, the increased contact stresses being particularly apparent at the cam nose 30 having a small radius of curvature which contacts the flat follower 36 at maximum lift.

The variable rate springs, shown in FIGS. 1 and 3, reduce the unnecessarily high spring forces at maximum lift while maintaining a sufficient spring force to compensate for negative valve acceleration and spring surge, by decreasing the spring rate at an intermediate surge lift position K on the valve lift curve 134 between the seated position J and the maximum lift position L.

The operation of the variable rate spring of FIG. 1 is illustrated with reference to FIGS. 6 and 7. When the valve 12 is in its seated position 20 and indicated as point J on the lift curve 134, the spring contact 86 applies a preload P to the spring 70, the preload P being sufficiently great to provide positive seating of valve 12. A further preload is provided by the stops 90, 92 to the intermediate portion 88 of spring 70. The spring 70 remains in engagement with the stops as the valve 12 is moved from the seated position to the intermediate position K. Only that portion of spring 70 from its free end 80 to that portion 88 which engages the stops 90, 92 is active and bends as the valve moves to position K so that the spring rate is linear and follows curve 142. At the intermediate valve position K, the preload of the stops 90, 92 is overcome and the spring parts from the stops. When disengaged from the stops, the effective length of the spring increases so that the entire length of spring 70 from its free end 82 to its fixed end 72 becomes active and bends.

By increasing the effective length of spring 70, the spring rate decreases as shown by curve 146. The lower spring rate 146 when multiplied by the valve lift, the product of which is added to the preload P, results in a spring force as shown by curve 148. It is seen that the variable rate spring provides an excess force of approximately A, the distance between points D and F at maximum lift L as opposed to 2A for a linear rate spring. The reduced spring rate reduces the contact stresses throughout the valve train assembly and thus increases the fatigue life of the valve train, particularly the cam 26.

While reducing the contact stresses in the valve train assembly 24, a sufficient spring force is still maintained by the variable rate spring to compensate for negative valve acceleration and spring surge. It is noted that the spring surge at overspeed operations is substantially reduced by use of the cantilevered spring since the spring has a high natural frequency. Further, the cantilevered spring is very compact in size so that it may be employed in engines having height restrictions.

The operation of the variable rate spring of FIG. 3 is also illustrated with reference to FIGS. 6 and 7. A preload is applied to the lower spring 94 by the spring retainer 98, the preload being sufficiently great so that only the upper spring 96 is active as the valve 12 moves from its seated position J to the intermediate position K. A preload P is also applied to the upper spring 96 by the spring retainer 82. As the valve moves from position J to position K with only the upper spring 96 being active and the effective length of spring 93 being equal to the length of the upper spring 96, the spring rate follows curve 142. When the valve 12 reaches the intermediate position K, the preload on the lower spring 94 is overcome so that the separator 110 moves away from the retainer flange 102 and the lower spring 94 becomes active.

At the intermediate position K the effective length of the spring 93 is increased to include both of springs 94 and 96 so that the spring rate is decreased as shown by curve 146. The lower spring rate 146 results in the spring force curve 148 so as to reduce contact stresses at maximum lift while maintaining a sufficient spring force to compensate for negative acceleration and spring surge.

The separator 110 is made radially elastic by slots 128 and 130 so as to rub lightly against the valve guide 66 to provide spring damping as the separator moves downward guided by the retainer wall 100. The separator 110 is more effective than conventional damping coils because it continuously rubs against the solid valve guide 66 thereby continuously dissipating energy by means of friction. This is in contrast to conventional damper coils which rub against a damper only when there is a dissimilarity in the spring surge of the damper coil and the spring surge of the spring valve. Further, the separator 110 does not rub against the valve springs 94, 93 but moves with the springs so that the separator does not reduce the valve spring's fatigue life.

Other aspects, objects and advantages of the invention can be obtained from a study of the drawings, the disclosure and the appended claims.

I claim:

1. In a valve train assembly (24) including a valve (12), a cam (26) engaging a cam follower (36), for moving said valve (12) through an intermediate position (K) between a seated position (J) and a maximum lift position (L), and spring means (70/93) for urging the valve (12) toward its seated position (J), the improvement comprising:

said spring means (70/93) having a first end (82/116), a second end (72/108), a preselected intermediate portion (88/97), a first effective length from said first end (80/116) to said intermediate portion (88/97) and a second effective length from said first end (80/116) to said second end (72/108), said spring having a first spring rate over said first effective length and a second spring rate over said second effective length, said second spring rate being of a lesser magnitude than said first spring rate; and stop means (90/92/98) for preloading said spring means (70/93) at said intermediate portion (88/97), only said first effective length being active in response to said valve moving between the seated position (J) and the intermediate lift position (K), said preload on said spring means (70/93) being overcome in response to said valve reaching the intermediate lift position (K), said second effective length being active in response to said valve moving between said intermediate position (K) and said maximum position (L).

2. The variable rate spring of claim 1 wherein the preload applied to said spring means (70/93) by said stop means (90/92/98) is not overcome until after the transition between positive and negative accelerations of the valve (12) as said valve moves between the seated position (J) and maximum lift position (L).

3. The variable rate spring of claim 1 wherein said spring means includes a cantilevered spring (70).

4. The variable rate spring of claim 1 wherein said spring means includes an upper spring (96) having said first effective length and a lower spring (94) being connected in series with said upper spring (96) and preloaded by said stop means (98).

5. In a valve train assembly (24) including a valve (12), a cam (26) engaging a cam follower (36) for moving said valve (12) through an intermediate position (K) between a seated position (J) and a maximum lift position (L), and a spring means (70) for urging the valve (12) toward its seated position (J), the improvement comprising:

said spring means (70) being cantilevered, having a free end (80) for engaging said valve (12), a fixed end (72), and a preselected intermediate portion (88) being located between said free end (80) and said fixed end (72); and stop means (90/92) for engaging said intermediate portion (88) of said spring (70) with said valve (12) being in the seated position (J), said spring (70) having a first spring rate when engaging said stop means (90/92), said spring (70) disengaging said stop means in response to said valve moving to an intermediate position (K) between the seated position (J) and maximum lift position (L), said spring (70) having a lesser spring rate when disengaged from said stop means (90/92) than when engaging said stop means (90/92).

6. The variable rate spring of claim 5 wherein only that portion of said cantilevered spring (70) from the free end (80) to the intermediate portion (88) is active in response to said valve being moved between the seated position (J) and the intermediate position (K) and said spring (70) from its free end (80) to its fixed end (72) is active in response to said valve being moved between the intermediate position (K) and the maximum position (L).

7. The variable rate spring of claim 5 wherein said intermediate portion (88) of said spring (70) which engages said stop means (90/92) has an increased thickness to compensate for fretting of the spring.

8. The variable rate spring of claim 5 wherein said cantilevered spring (70) is of variable thickness, having a greater thickness at the fixed end (72) than the thickness of the spring at the free end (80).

9. The variable rate spring of claim 5 wherein said cantilevered spring (70) is C-shaped.

10. In a valve train assembly including a valve (12) having a valve stem (64) extending through a cylinder head (18), a spring retaining means (82) mounted on said valve stem (64), a rocker arm (50) pivotally supported between a pair of brackets (54/56), said rocker arm (50) engaging said valve stem (64) to move said valve (12) through an intermediate position (K) between a seated position (J) and a maximum lift position (L), and a spring means (70) for urging the valve (12) toward its seated position (J), the improvement comprising:

said spring means (70) being cantilevered, having a free end (80) for engaging said spring retaining means (82), a fixed end secured to said cylinder head (19), and an intermediate portion (88) between said free end (80) and said fixed end (72); and stop means (90/92) being mounted on said brackets (54/56) for engaging said intermediate portion (88) of said spring in response to said valve (12) moving to an intermediate position (K) between said seated (J) and maximum lift (L) positions, said spring (70) having a first spring rate when engaging said stop means (90/92), said spring (70) disengaging said stop means (90/92) in response to said valve reaching the intermediate position (K), said spring (70) having a lesser spring rate when disengaged from said stop means (90/92) than when engaging said stop means (90/92).

11. The variable rate spring of claim 10 wherein said fixed end (72) is mounted between the cylinder head 18 and the brackets (54/56).

12. The variable rate spring of claim 10 wherein said stop means (90/92) are mounted on the facing surface of said brackets (54/56).

13. The variable rate spring of claim 12 wherein said cantilevered spring is C-shaped, extending between said brackets (54/56).

14. The variable rate spring of claim 10 wherein said cantilevered spring (70) includes a pair of cantilevered springs portions (76/78) extending from said fixed end (72), each of said spring portions (76/78) having a free end (80) for engagement with said retaining means (82) on either side of said valve stem (64).

15. In a valve train assembly (24) including a valve (12), a cam (26) engaging a cam follower (36) for moving said valve (12) through an intermediate position (K) between a seated position (J) and a maximum lift position (L), and a spring means (93) for urging the valve (12) toward its seated position (J), the improvement wherein said spring means (93) comprising:

first spring means (94);

second spring means (96) being disposed on top of and being connected in series with said first spring means (94), said second spring means (96) having a first spring rate and being compressable in response to said valve (12) moving from the seated position (J) through an intermediate position (K) to the maximum lift position (L); and retaining means (98) for engaging said first spring means (94) when said valve (12) is in the seated position (J), said first spring means (94) being inactive in response to said valve moving between said seated position (J) and an intermediate lift position (K), said first spring means disengaging said retaining means in response to said valve (12) reaching the intermediate lift position (K), said first spring means (94) acting in series with said second spring means (96) in response to said valve (12) moving between the seated (J) and maximum lift (L) positions to provide a lesser spring rate than when engaging with retaining means (98).

16. The variable rate spring of claim 15 wherein said first spring means (94) and said second spring means (96) each include a coil spring.

17. The variable rate spring of claim 15 wherein the first spring means (94) includes a separator (110) for engagement with said second spring means (96).

18. Th variable rate spring of claim 17 wherein said separator (110) is a spring damper movable with said second spring means (96) when said first spring means disengages said retaining means (98).

19. The variable rate spring of claim 18 wherein said separator means (110) is guided by said retaining means (98).

20. In a valve train assembly including a valve (12) extending through a valve guide (66) mounted on a cylinder head (18), a cam (26) engaging a cam follower (36) for moving said valve (12) between a seated position (J) and a maximum lift position (L), and a spring means (93) for urging the valve (12) toward its seated position (J), the improvement comprising:

said spring means (93) having:

first spring means (94);

second spring means (96) connected in series with said first spring means (94) and compressing as said valve (12) moves between the seated (J) and maximum lift (L) positions;

a separator (110) being disposed between said first spring means (94) and said second spring means (96);

retaining means (98) mounted on said cylinder head (18) for engaging with said separator (110) as said valve moves between the seated position (J) and an intermediate position (K) so that said first spring means is inactive, said separator means (110) disengaging said retaining means (98) when said valve (12) reaches the intermediate position (K), said first spring means (94) acting in series with said second spring means (96) as said valve (12) moves between the intermediate lift position (K) and the maximum lift position (L), said separator (110) moving with said first and second spring means.

21. The variable rate spring of claim 20 wherein the valve guide (66) extends through the separator (110), the separator at its inner periphery rubbing against the valve guide to provide spring damping as the separator (110) moves with said first (94) and second (96) spring means.

22. The variable rate spring of claim 21 wherein said separator (110) is made radially flexible by alternating slots (126/128) formed therein.

23. The variable rate spring of claim 21 wherein said separator (110) includes an upwardly extending flange (120) at the inner periphery of the separator (110) for rubbing against the valve guide (66).

24. The variable rate spring of claim 20 wherein the separator means includes a downwardly extending flange (122) at the outer periphery of said separator (110) for guiding the separator in the retaining means.

* * * * *